United States Patent [19]

Higashimata et al.

[11] Patent Number: 4,919,494

[45] Date of Patent: Apr. 24, 1990

[54] ANTI-SKID BRAKE CONTROL SYSTEM WITH AVOIDANCE OF ABRUPT AND SUBSTANTIAL VARIATION OF WHEEL SLIPPAGE

[75] Inventors: Akira Higashimata; Yoshiki Yasuno, both of Kanagawa, Japan

[73] Assignee: Nissan Motor Company, Limited, Yokohama, Japan

[21] Appl. No.: 343,992

[22] Filed: Apr. 27, 1989

[30] Foreign Application Priority Data

Apr. 28, 1988 [JP]  Japan .................................. 63-107270

[51] Int. Cl.$^5$ .............................................. B60T 8/32
[52] U.S. Cl. .................................. 303/100; 188/181 A; 303/95; 303/102; 303/110; 364/426.02
[58] Field of Search ......................... 303/91, 95, 97, 99, 303/98, 100, 102, 103, 105, 106, 107, 108, 109, 110, 113, 119; 188/181; 364/426.02

[56] References Cited

U.S. PATENT DOCUMENTS

| | | |
|---|---|---|
| 4,384,330 | 5/1983 | Matsuda et al. . |
| 4,392,202 | 7/1983 | Matsuda . |
| 4,408,290 | 10/1983 | Kubo et al. . |
| 4,430,714 | 2/1984 | Matsuda et al. . |
| 4,460,146 | 7/1984 | Raggiotti . |
| 4,569,560 | 2/1986 | Kubo . |
| 4,597,052 | 6/1986 | Matsuda . |
| 4,637,663 | 1/1987 | Matsuda . |
| 4,656,588 | 4/1987 | Kubo . |
| 4,662,686 | 5/1987 | Matsuda . |
| 4,663,715 | 5/1987 | Kubo . |
| 4,663,716 | 5/1987 | Kubo . |
| 4,665,491 | 5/1987 | Kubo . |
| 4,667,176 | 5/1987 | Matsuda . |
| 4,669,045 | 5/1987 | Kubo . |
| 4,669,046 | 5/1987 | Kubo . |
| 4,674,049 | 6/1987 | Kubo . |
| 4,674,050 | 6/1987 | Kubo . |
| 4,679,146 | 7/1987 | Kubo . |
| 4,680,713 | 7/1987 | Kubo . |
| 4,680,714 | 7/1987 | Kubo . |
| 4,682,295 | 7/1987 | Kubo . |
| 4,683,537 | 7/1987 | Matsuda . |
| 4,704,684 | 11/1987 | Kubo . |
| 4,718,013 | 1/1988 | Kubo . |
| 4,763,912 | 8/1988 | Matsuda . |
| 4,771,850 | 9/1988 | Matsuda . |
| 4,780,818 | 10/1988 | Kubo . |
| 4,805,103 | 2/1989 | Matsuda . |
| 4,809,182 | 2/1989 | Matsuda . |
| 4,824,184 | 4/1989 | Spadafora et al. .................. 303/100 |

Primary Examiner—Douglas C. Butler
Attorney, Agent, or Firm—Foley & Lardner Schwartz, Jeffery, Schwaab, Mack, Blumenthal & Evans

[57] ABSTRACT

An anti-skid brake control system for monitoring variation of wheel slippage and whereby detects APPLICATION mode of the anti-skid brake control system and for detecting HOLD mode of the anti-skid brake control. The system comprises a period of time where the operational mode is maintained at HOLD mode condition. When the period to maintain the HOLD mode becomes longer than a predetermined period, than the system set smaller rate for increasing the braking pressure in the subsequent APPLICATION mode.

11 Claims, 5 Drawing Sheets

ANTI-SKID BRAKE CONTROL SYSTEM WITH AVOIDANCE OF ABRUPT AND SUBSTANTIAL VARIATION OF WHEEL SLIPPAGE

BACKGROUND OF THE INVENTION

Field of the Invention

The present invention relates generally to an anti-skid brake control system for an automotive vehicle. More specifically, the invention relates to a technology for preventing wheel slippage from causing abrupt and substantial variation.

Japanese Patent Second (allowed) Publication (Tokko) Showa 50-34185, Japanes Patent First (unexamined) Publication (Tokkai) Showa 56-79043 disclose typical construction of anti-skid brake control systems. Each of the disclosed system includes means for detecting wheel speed and projected vehicle body speed data, means for deriving a wheel slippage and wheel acceleration and means for comparing brake control parameters, such as the wheel speed, wheel slippage and wheel acceleration, with respectively corresponding reference values for controlling braking pressure in a wheel cylinder.

In such anti-skid brake control, wheel slippage varies in relation to variation of braking force or braking torque with a certain lag factor. This lag factor sometimes influences for performance of anti-skid control. Namely, assuming the braking torque is TQB, a wheel slippage is $\lambda$, a wheel acceleration is $\alpha$, inertia moment on the wheel is I, an angular velocity of the wheel is $\omega$, a road surface friction coefficient is $\mu$, a weight load applied for the wheel is W and an effective radius of the wheel is R, a vehicle body speed, K is a proportional constant, and in a micro period, V is constant the equation of motion of the wheel can be as follows:

$$T\omega = \mu WR - TQB \quad (1)$$
$$= K(\lambda/V)WR - TQB$$

where $\mu = K(\lambda/V)$

From the foregoing equation (1), the wheel acceleration $\alpha$ can be illustrated by:

$$\alpha = -R\omega \quad (2)$$
$$= (R/I)\{-K(\lambda/V)WR + TQB\}$$

Assuming $\Delta V = V - R\omega$ and thus $\omega = (1/R) \times (V - \Delta V)$, the foregoing equation can be modified as:

$$I \times (d/dt) \times \{(V-\lambda)/R\} = K(\lambda/V)WR - TQB$$

By Laplace transformation of the foregoing equation, the following equation can be obtained:

$$I\{-(\lambda/R)s\} = K(\lambda/V)WR - TQB$$

Therefore, wheel slippage can be derived by:

$$\lambda(s) = (V/KWR)/\{1 + (IV/KWR^2)s\} \times TQB \quad (3)$$

While the braking torque TQB is increased, wheel slippage increases with a certain lag time. When held constant at the increased level after increasing braking torque, the wheel slippage is maintained to increase for the presence of the certain lag time as the primary lag factor as can be appreciated from the foregoing equation (3). On the other hand, as can be clear from the foregoing equation (2), the wheel aceleration $\alpha$ varies according to variation of the wheel slippage$\lambda$ when the braking torque TQB is maintained constant. Accordingly, when after switching the operational mode in the skid control cycle from an APPLICATION mode for increasing the braking torque to a HOLD mode for holding the braking torque constant, the wheel deceleration $\alpha$ decreases according to increasing of the wheel slippage $\lambda$. After decreasing the magnitude wheel deceleration across a predetermined deceleration criterion and decreasing of wheel slippage across a predetermined wheel slippage criterion, the operational mode again returns to the APPLICATION mode to increase the braking pressure. Since the wheel slippage variation contains a certain primary lag factor relative to variation of the braking torque variation, braking torque can be excessively increased during this lag period to cause expansion of the period to maintain RELEASE mode for decreasing the braking pressure for recovery of wheel traction. This causes excessive braking torque to be applied to the vehicular wheel to cause reduction of the road friction coefficient and whereby to cause cornering force. This may degrade driving stability of the vehicle.

SUMMARY OF THE INVENTION

In view of the defect in the prior art set forth above, it is an object of the present invention is to provide an anti-skid brake control system which can solve the problem encountered in the prior art.

Another object of the invention is to provide an anti-skid brake control system which can minimize variation magnitude of the wheel slippage and can minimize reduction of cornering force.

In order to accomplish the aforementioned and other objects, an anti-skid brake control system, according to the present invention, has means for monitoring variation of wheel slippage and whereby detects APPLICATION mode of the anti-skid brake control system and means for detecting HOLD mode of the anti-skid brake control. The system compares a period of time where the operational mode is maintained at HOLD mode condition. When the period to maintain the HOLD mode becomes longer than a predetermined period, then the system set smaller rate for increasing the braking pressure in the subsequent APPLICATION mode.

According to one aspect of the invention, an anti-skid brake control system for controlling a braking pressure for maintaining a wheel slippage in the vicinity of a predetermined optimum level the anti-skid control system comprises:

a braking circuit connecting a pressurized fluid source to a wheel cylinder for each of the front and rear wheels for building up braking pressure in the latter;

a pressure control valve means, disposed in the braking circuit, for controlling braking pressure in the wheel cylinder, the pressure control valve means operable for increasing braking pressure in the wheel cylinder in a first mode, decreasing braking pressure in the wheel cylinder in a second mode, and to hold the braking pressure in the wheel cylinder constant in a third mode;

first sensor for monitoring rotation speed of associated one of the front and rear wheels for producing a wheel speed indicative signal;

second means for deriving a wheel slippage on the basis of the wheel speed indicative signal and producing a wheel slippage data;

control means for producing a first control signal for controlling operation mode of the pressure control valve means for switching operation mode between the first, second mode and third mode in order to maintain wheel slippage in the vicinity of the predetermined optimum value, the control means measuring a period in which the pressure control valve means is maintained at the third mode subsequently of the first mode operation so that increasing rate of braking pressure is varied according to the period.

According to another aspect of the invention, an anti-skid brake control system for controlling a braking pressure for maintaining a wheel slippage in the vicinity of a predetermined optimum level the anti-skid control system comprises:

a braking circuit connecting a pressurized fluid source to a wheel cylinder for each of the front and rear wheels for building up braking pressure in the latter;

a pressure control valve means, disposed in the braking circuit, for controlling braking pressure in the wheel cylinder, the pressure control valve means operable for increasing braking pressure in the wheel cylinder in a first mode, decreasing braking pressure in the wheel cylinder in a second mode, and to hold the braking pressure in the wheel cylinder constant in a third mode;

first sensor for monitoring rotation speed of associated one of the front and rear wheels for producing a wheel speed indicative signal;

second means for deriving a wheel slippage on the basis of the wheel speed indicative signal and producing a wheel slippage data;

control means for producing a first control signal for controlling operation mode of the pressure control valve means for switching operation mode between the first, second mode and third mode in order to maintain wheel slippage in the vicinity of the predetermined optimum value, the control means measuring a period in which the pressure control valve means is maintained at the third mode subsequently of the first mode operation, the control means comparing the measured period with a predetermined time threshold so that a first greater increasing rate of the braking pressure in the wheel cylinder in the first mode is selected when the measured period is shorter than the time threshold and otherwise select a second smaller increasing rate Preferably, the pressure control valve is maintained in the first mode for linearly increasing braking pressure when the first greater increasing rate is selected, and is periodically alternated between the first and third mode with short intervals for increasing braking pressure in stepwise fashion when the second smaller increasing rate is selected. The control means may select one of the first and third mode for controlling the pressure control valve operational mode while the wheel slippage is maintained smaller than a predetermined wheel slippage criterion. The control means may select the first mode when a wheel acceleration derived on the basis of the wheel speed indicative signal is maintained greater than a predetermined wheel slippage threshold and otherwise selects the third mode. The control means may select the second mode when the wheel slippage is maintained greater than or equal to the predetermined wheel slippage criterion.

BRIEF DESCRIPTION OF THE DRAWINGS

The present invention will be understood more fully from the detailed description given herebelow and from the accompanying drawings of the preferred embodiment of the present invention, which, however, should not be limited to the invention to the specific embodiment as disclosed herebelow, but are for explanation and understanding only.

In the drawings.

DESCRIPTION OF THE PREFERRED EMBODIMENT

Figure 1:
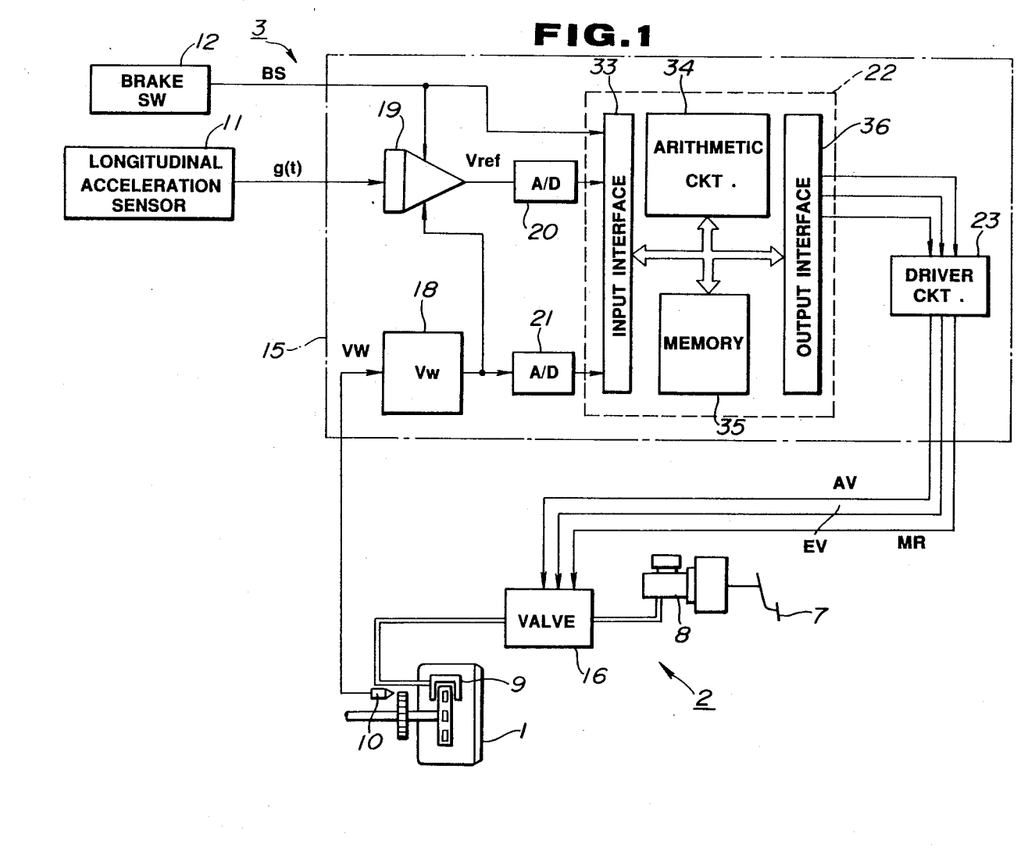
FIG. 1 is a block diagram of the preferred embodiment of an anti-skid brake control system, according to the present invention.

Referring now to the drawings, particularly to FIG. 1, the preferred embodiment of an anti-skid brake control system 3, according to the present invention, is applied to an automotive brake system including a brake pedal 7 which is mechanically associated with a master cylinder 8. The master cylinder 8 is connected to a wheel cylinder 9 of a vehicular wheel 1 via a pressure control valve 16. The pressure control valve 16 is electrically connected to a control unit 15 to be controlled the operational mode over each skid control cycle according to a predetermined schedule.

The control unit 15 is connected to a wheel speed sensor 10 which is designed to produce an alternating current signal vw having a frequency proportional to the rotation speed of the wheel 1. The control unit 15 is also connected to a longitudinal acceleration sensor 11 which monitors longitudinal acceleration exerted on the vehicle body and produces a longitudinal acceleration indicative signal Gx, and a brake switch 12 which outputs HIGH level braking state indicative signal BS when the brake pedal 7 is depressed and thus the vehicular brake is applied, and otherwise outputs LOW level braking state indicative signal representing that brake is not applied.

The control unit 15 includes a wheel speed derivation circuit 18, an integrator 19, analog-to-digital (A/D) converters 20 and 21, a microprocessor 22, a driver circuit 23. The wheel speed derivation circuit 18 comprises a frequency-to-voltage (F/V) converter which converts the alternating current signal vw input from the wheel speed sensor 10 into a wheel speed indicative voltage signal Vw having a voltage level corresponding to the frequency of the alternating current signal and thus representing the wheel speed. The wheel speed indicative voltage signal Vw is converted by the A/D converter 21 and input to the microprocessor 22 as the wheel speed indicative data Vw. Simultaneously, the wheel speed indicative voltage signal Vw is fed to the integrator 19. The brake switch 12 feeds the braking state indicative signal BS to themicroprocessor 22. The brake switch 12 is also connected to the integrator 19 to feed the braking state indicative signal. On the other hand, the longitudinal acceleration indicative signal Gx of the longitudinal acceleration sensor 11 is input to the integrator 19.

The integrator 19 is responsive to the leading edge of the HIGH level braking state indicative signal BS to latch an instantaneous value of the wheel speed indicative voltage signal Vw. At the same time, the integrator 19 resets an integrated value and restart integration of the longitudinal acceleration indicative signal value Gx. The integrator 19 add the integrated value the the latched value to derive a vehicle body speed representative data $V_{ref}$. The vehicle body speed representative data $V_{ref}$ can be calculated from the following equation:

$$V_{ref}(t) = Vw(T_O) - \int g(t)dt \quad (4)$$

The vehicle body speed representative data $V_{ref}$ is fed to the microprocessor 22 via the A/D converter 20.

The microprocessor 22 includes an input interface 33, an arithmetic circuit 34, a memory unit 35 and an output interface 36. The arithmetic circuit 34 performs control programs which will be discussed later for performing anti-skid brake control operation. The microprocessor 22 outputs an inlet control signal EV, an outlet control signal AV and a pump control signal MR to the driver circuit 23. With these control signals, the operational mode of the pressure control valve 16 is controlled.

Figure 2:
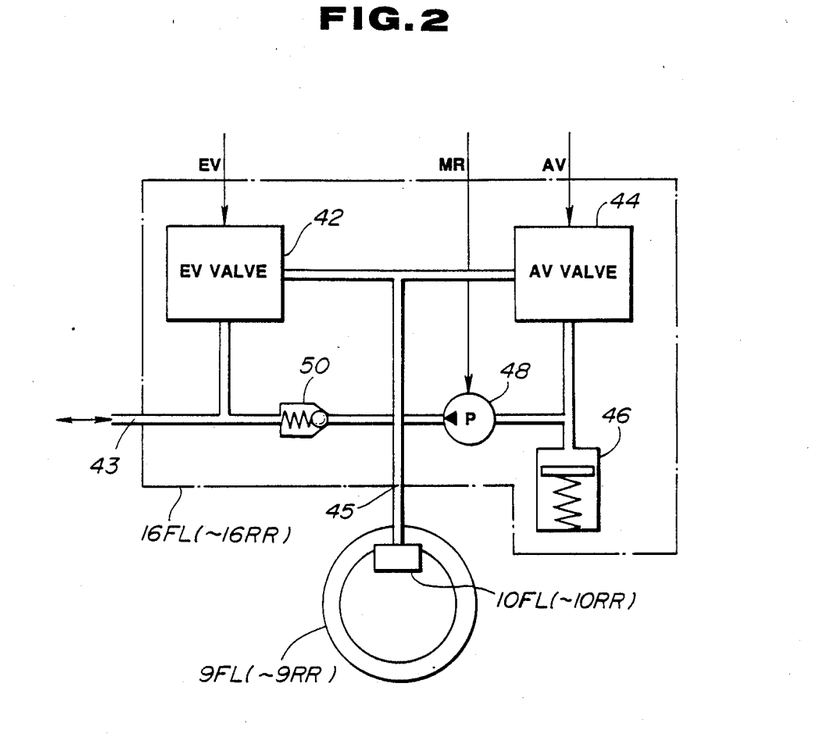
FIG. 2 is a block diagram showing detailed construction of a pressure control valve unit disposed in a vehicular brake circuit employed in the preferred embodiment of the anti-skid brake control system according to the invention.

As shown in FIG. 2, the pressure control valve unit 16 comprises an induction control valve 42 which will be hereafter referred to as "EV valve", a drain control valve 44, which will be hereafter referred to as "AV signal" and a drain pump 48 and a pressure accumulator 46. The pressure control valve 16 has an inlet port 43 connected to the master cylinder 8 to receive the working fluid pressure built up in the latter and an outlet port 45 connected to wheel cylinder 10. The EV valve 42 is interposed between the inlet port 43 and the outlet port 45 for controlling introduction of the pressurized working fluid to the wheel cylinder 10. The AV valve 44 is connected to the outlet of the EV valve 42, the outlet port 45 at the inlet side and to the pressure accumulator 46 and the drain pump 48. The discharge outlet drain pump 48 is connected to the inlet port 43 via a one-way check valve 50 for returning part of working fluid in the pressure control valve unit 16 to the fluid reservoir (not shown) and designed for supplying pressurized working fluid.

With the construction set forth above, the pressure control valve unit 22 essentially operates in three mutually different operational modes. Name, the pressure control valve unit 22 operates in an APPLICATION mode for increasing braking pressure in the wheel cylinder 10, a RELEASE mode for decreasing braking pressure in the wheel cylinder, and a HOLD mode to maintain the braking pressure constant. In the APPLICATION mode position, the EV valve 42 is maintained in open position to establish fluid communication between the master cylinder 8 and the wheel cylinder 10 and the AV valve 44 is maintained closed position for blocking fluid communication between the wheel cylinder 10 and the pressure accumulator 46. At the same time, the drain pump 48 may be held inoperative state.

In the RELEASE mode position of the pressure control valve unit 16, the EV valve 42 is held closed to block fluid communication between the inlet port to the outlet port and whereby blocking pressure supply from the master cylinder 8 to the wheel cylinder 10. At the same time, the AV valve 44 is maintained at open position to establish fluid communication between the outlet port 45, and the pressure accumulator 46 and the drain pump 48 so that the pressurized fluid in the wheel cylinder 10 can be drained to the pressure accumulator 46 or to the fluid reservoir via the drain pump 48 and the one-way check valve 50. In order to drain part of the working fluid from the wheel cylinder to the fluid reservoir, the drain pump 48 is driven in this RELEASE mode. On the other hand, in the HOLD mode position, both of the EV valve 42 and the AV valve 44 are held closed for completely disconnecting the wheel cylinder 10 from the inlet port 43 and the pressure accumulator 46.

The EV valve 42 is held open position in response to LOW level EV signal and shifted to closed position in response to the HIGH level EV signal. On the other hand, the AV valve 44 is maintained at closed position as long as the AV signal is held LOW level and is opened by the HIGH level AV signal. The drain pump 48 is driven by the HIGH level MR signal.

The pressure control valve unit 16 is generated operated in the aforementioned three mode positions over skid control cycles. In general, skid control cycle is scheduled as follows:

(1) the pressure control valve unit 16 is maintained at the APPLICATION mode position upon initiation of the braking operation which is triggered by depression of the brake pedal 6, (2) by application of the braking force to the brake pedal, working fluid pressure is built up in the master cylinder 8, since the pressure control valve unit 16 is held at the APPLICATION mode position, the braking pressure in the wheel cylinder 10 is increased linearly in proportion to increasing of the working fluid pressure to decelerate the wheel speed;

(3) by increasing of the braking pressure, wheel deceleration $-\alpha$ (negative value of wheel acceleration) increases and becomes greater than a predetermined deceleration threshold $-\alpha_{ref}$, the control unit 22 is responsive to the wheel deceleration increased across the deceleration threshold to initiate skid control cycle, upon which the skid control cycle enters into HOLD mode cycle period to place the pressure control valve unit 16 at the HOLD mode position to maintain the increased level of braking pressure constant;

(4) by holding the increase level of braking pressure in the HOLD mode position of the pressure control valve unit 16, wheel is decelerated to increase wheel slippage across a predetermined wheel slippage threshold, the control unit 22 is responsive to increasing of the wheel slippage increasing across the wheel slippage threshold to terminal the HOLD mode cycle period and trigger RELEASE mode cycle period, in which the pressure control valve unit 16 is placed in the RELEASE mode position to decrease braking pressure in the wheel cylinder 10;

(5) by maintaining the pressure control valve unit 16 in the RELEASE mode position, braking pressure is reduced and thus wheel is accelerated to result in increasing of wheel acceleration $+\alpha$ across a predetermined wheel acceleration threshold $+\alpha_{ref}$, the control unit 22 is responsive to increasing of the wheel acceleration $+\alpha$ across the wheel acceleration threshold $+\alpha_{ref}$ to terminate the RELEASE mode cycle period and trigger a HOLD mode cycle period to switch the position of the pressure control valve unit 16 from the RELEASE mode position to the HOLD mode position in order to hold the braking pressure at the lowered level;

(6) by maintaining the pressure control valve unit 16 at the HOLD mode, wheel speed is resumed and increased across the vehicle body speed and subsequently return to the speed corresponding to the vehicle body speed, the control unit 22 is responsive to the wheel speed once increased across the vehicle body speed and subsequently return to the vehicle body speed to terminate HOLD mode cycle period and trigger APPLICATION mode cycle period;

skid cycles (3) to (6) are repeated while anti-skid control is active.

The followings are discussion of the practical process of anti-skid brake control operation performed by the preferred embodiment of the anti-skid brake control system set forth above.

Figure 3:
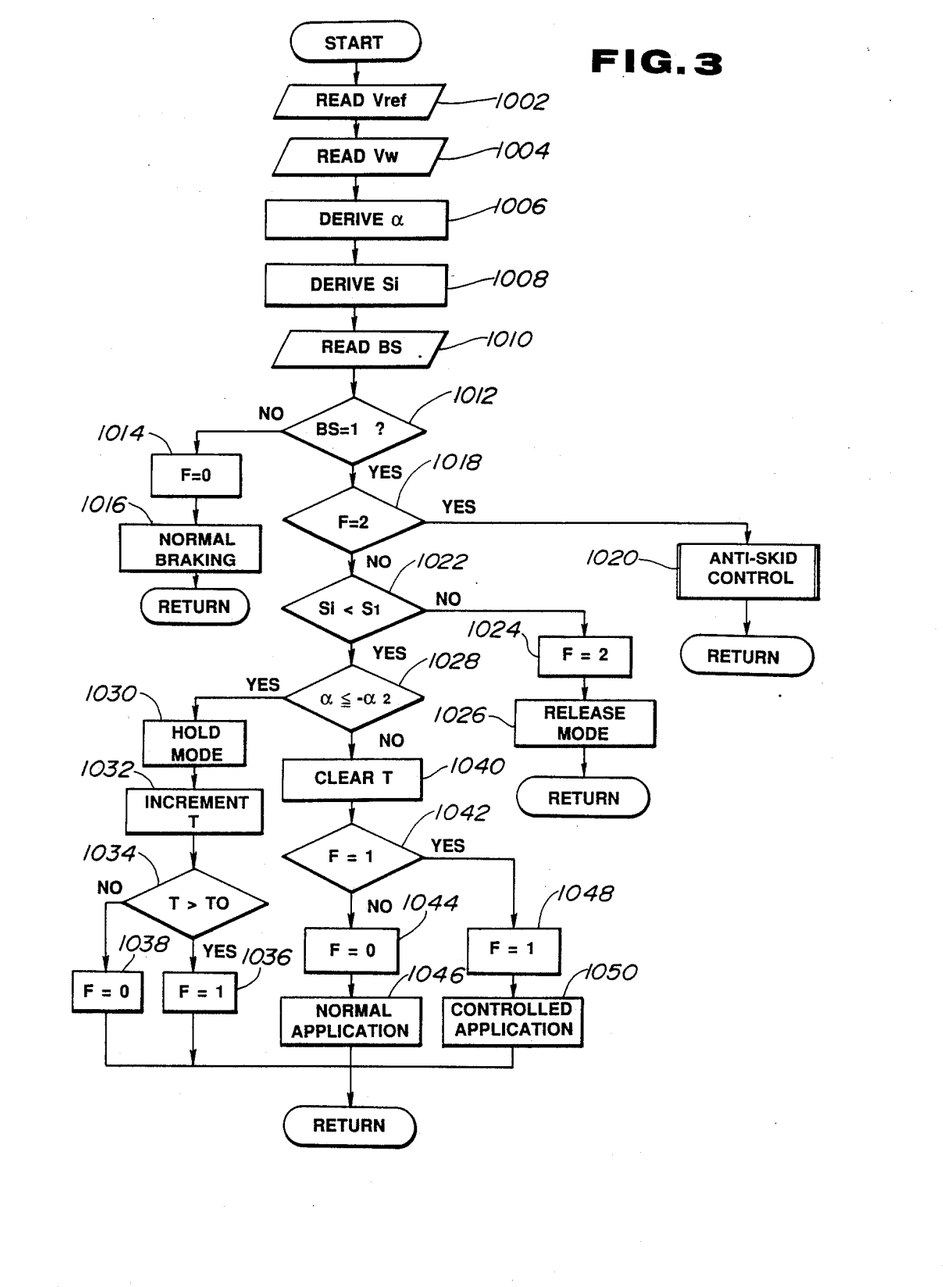
FIG. 3 is a flowchart showing an interrupt routine for setting and resetting a skid cycle indicative flag.
Figure 4:
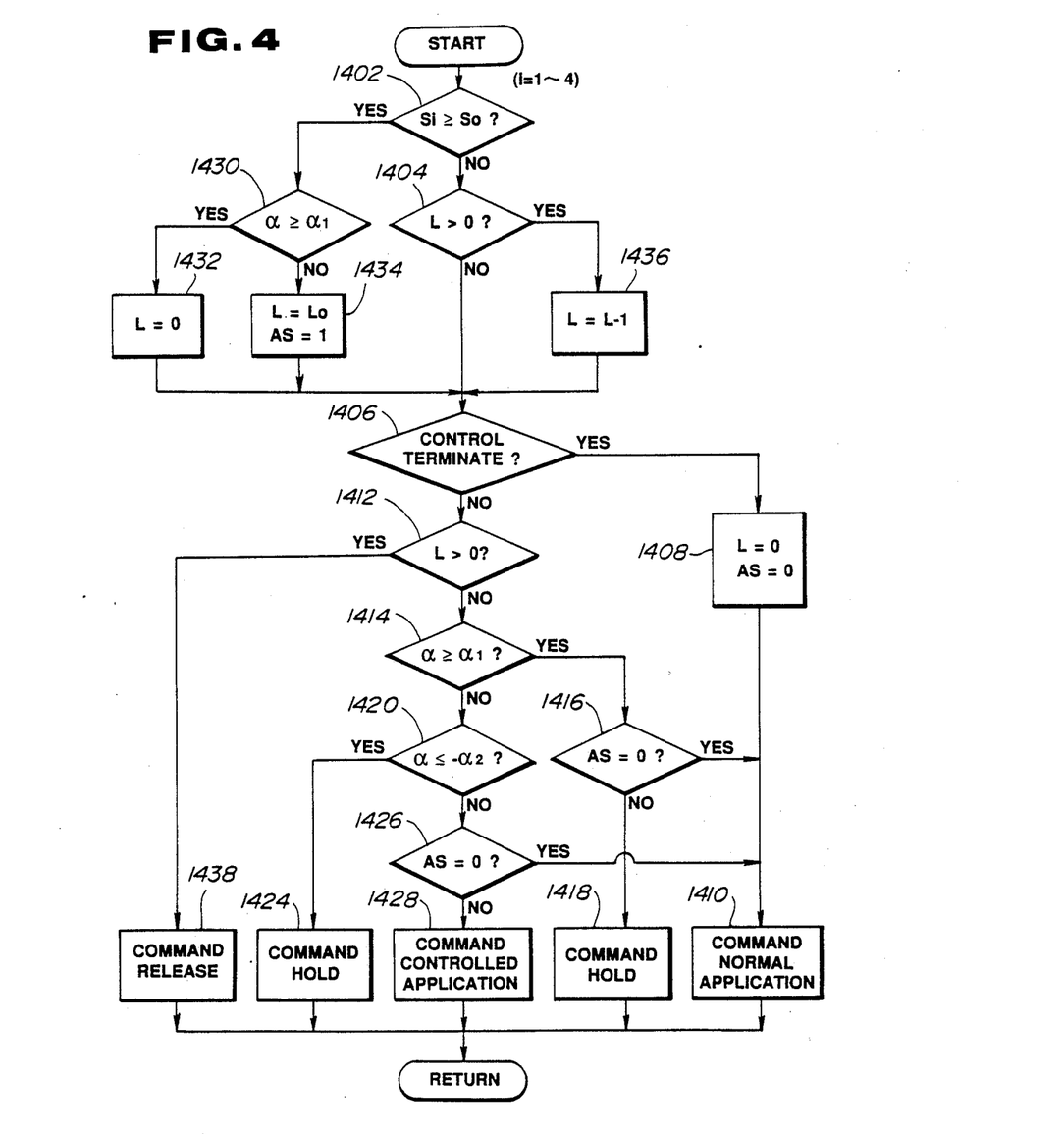
FIG. 4 is a flowchart showing an interrupt routine for selecting operation mode of the pressure control valve unit of FIG. 2.
Figure 5:
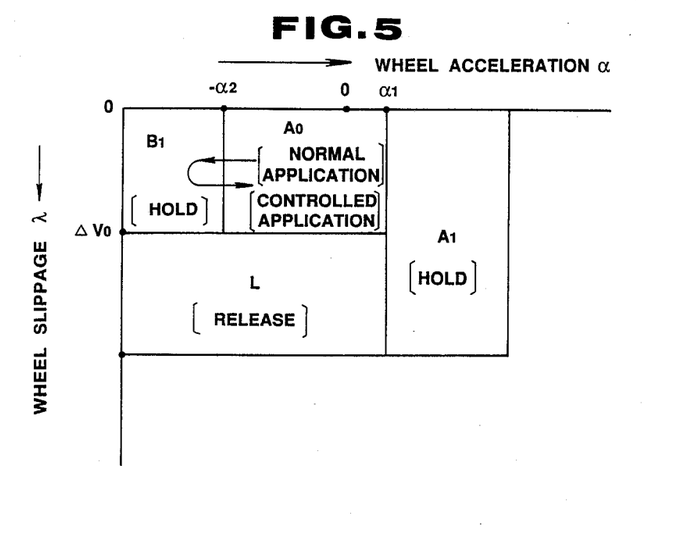
FIG. 5 is an illustration showing schedule of skid control cycle in an anti-skid brake control.

The shown embodiment of the anti-skid brake control system is triggered in response to turning ON of the ignition switch to initiate power supply. Then, wheel speed sensor 10 starts monitoring of rotation speed of the wheel 1. The wheel speed sensor 10 thus continuously produces the wheel speed indicative signals vw. The alternating current form wheel speed indicative signals vw is cyclically or periodically converted into digital wheel speed indicative data Vw to be input to the microprocessor 22. Simultaneously, the wheel speed indicative voltage signals Vw are fed to the integrator 19. The routine shown in FIGS. 3 to 5 are triggered every predetermined timing, e.g. every 20 msec while the vehicular braking state is maintained. It should be noted that the routines shown in FIGS. 3 to 5 are executed with respect to each wheels independently of each other. The routines for respective wheels may be executed every four cycles of execution cycles. In the alternative, respective execution cycles of the routines for respective wheels may be performed at different phases so as to enable independent brake control at equal interval, e.g. 20 msec.

In the process illustrated in FIG. 3, at a step 1002 performed immediately after starting execution, the vehicle body speed representative data $V_{ref}$ is read out and temporarily stored in a temporary register in the memory unit 34. Then, the wheel speed indicative data Vw is read out at a step 1004 and temporarily stored in the temporary register. At a step 1006, the wheel acceleration $\alpha$ is derived. The wheel slippage Si is derived on the basis of the wheel speed indicative data Vw and the vehicel body speed indicative data $V_{ref}$ at a step 1008. Then, the braking state indicative signal BS is read at a step 1010. The braking state indicative signal level BS is checked at a step 1012 whether the present status is braking state or not. When the braking state indicative signal level BS is LOW and the answer at the step 1012 is negative, then, a MODE indicative flag F is set to zero at a step 1014. Subsequently, normal state braking operation is ordered at a step 1016. Thereafter, process returns to the main routine.

On the other hand, when the braking state indicative signal level BS is HIGH as checked at the step 1012, then check is performed whether the MODE indicative flag F is set to two (2) at a step 1018. When the MODE indicative flag F is set at two (2) as checked at the step 1018, an anti-skid brake control is ordered at a step 1020. On the other hand, when the MODE indicative flag F is not set at two (2) as checked at the step 1018, than the wheel slippage Si is compared with a wheel slippage criterion Sl at a step 1022. When the wheel slippage Si is greater than or equal to the wheel slippage criterion Sl and thus the answer at the step 1022 is negative, then the MODE indicative flag F is set to two (2) at a step 1024 and subsequently the RELEASE mode is ordered at a step 1026.

On the other hand, when the wheel slippage Si is smaller than the wheel slippage criterion Sl as checked at the step 1022, the wheel acceleration $\alpha$ is compared with a wheel deceleration threshold $-\alpha_2$ at a step 1028. If the wheel acceleration $\alpha$ is smaller than or equal to the wheel deceleration threshold $-\alpha_2$ as checked at the step 1028, then HOLD mode is ordered at a step 1030. Therefore, a HOLD mode timer value T is incremented by one (1), at a step 1032. Then, the HOLD mode timer value T is compared with a predetermined timer threshold $T_O$ at a step 1034. When the HOLD mode timer value T is greater than the timer threshold $T_O$ as checked at the step 1034, the MODE indicative flag F is set to one (1) at a step 1036. On the other hand, if the HOLD mode timer value T is smaller than or equal to the timer threshold $T_O$, then the MODE indicative flag is set at zero (0) at a step 1038.

If the wheel acceleration $\alpha$ is greater than the wheel deceleration threshold $-\alpha_2$, then the HOLD mode timer value T is cleared at a step 1040. Then, the MODE indicative flag F is checked whether the value thereof is one (1) or not at a step 1042. When the MODE indicative flag F is not one (1), the flag value is set at zero (0) at a step 1044. Thereafter, the normal APPLICATION mode is ordered at a step 1046. On the other hand, if the MODE indicative flag is set at one (1) as checked at the step 1042, the flag value is set at one (1) at the step 1048, and the controlled APPLICATION mode is ordered at a step 1050.

At a step 1006, a wheel acceleration $\alpha$ is calculated on the basis of the instantaneous wheel speed indicative data with precedingly read wheel speed data. It is of course possible to derive the wheel acceleration on the basis of the wheel speed difference between the instantaneous wheel speed indicative data value and the wheel speed indicative data value read at immediately preceding execution cycle, and a known execution interval. However, it is also possible to derive the wheel acceleration more precise manner as disclosed in the foregoing United States Patents Nos.

U.S. Pat. No. 4,392,202, issued on July 5, 1983
U.S. Pat. No. 4,384,330, issued on May 23, 1984.

Furthermore, it is also possible to derive the wheel acceleration by differentiating the wheel speed indicative data as disclosed in the United States Patents listed herebelow.

U.S. Pat. No. 4,430,714, issued on Feb. 7, 1984

All of the above-identified United States Patents are owned by the common assignee to the present invention. The disclosure of these United States Patents are herein incorporated by reference for the sake of disclosure.

FIG. 4 shows a skid cycle control routine for controlling the skid control cycle generally according to the schedule set forth in the general discussion of the process of anti-skid brake control. The skid cycle control routine of FIG. 4 with the discussed herebelow with additionally reference to FIGS. 5 and 6. It should be noted in the timing chart of FIG. 6, the lines showing the wheel speed $V_w$, the vehicle body speed $V_{ref}$ are illustrated.

It is assumed that the vehicle is traveling steadily before braking operation and anti-skid control being not active. Unless brake is applied, wheel slippage Si is generally maintained zero. Therefore, in the skid cycle control schedule as shown in FIG. 5, the entering point to enter the vehicle braking state is a. At this condition, the routine of FIG. 4 is triggered to be periodically executed in response to depression of the brake pedal.

Immediately after starting execution, the wheel slippage Si is compared with a predetermined wheel slippage threshold $S_O$ at a step 1402. The wheel slippage threshold $S_O$ may be set at about the optimum wheel slippage range where an optimum vehicle braking efficiency can be obtained. In the shown embodiment, the wheel slippage threshold $S_O$ is set at 15%.

At the initial stage of the braking operation, wheel slippage Si is held smaller than that wheel slippage threshold $S_O$. Therefore, the answer at the step 1402 at the initial braking state becomes negative. Then, at a step 1404, check is performed whether a RELEASE mode timer value L of a RELEASE mode timer (not shown but facilitated in the arithmetic circuit 34 of the microprocessor 22) is greater than zero or not. At this time, the RELEASE mode timer value L is maintained at zero, the anser at the step 1404 also becomes negative. Then, at a step 1406, judgement is made that the condition satisfies a predetermined skid control terminating condition.

In the practical embodiment, the skid control terminating conditions are set as follows:
when the vehicle body speed indicative data $V_{ref}$ is smaller than or equal to a vehicle body stopping state indicative reference value $V_{ref0}$;
when number of occurrence of switching of the pressure control valve mode position in the CONTROLLED APPLICATION mode becomes greater than or equal to a predetermined value $N_O$; and
when the brake switch is turned OFF.

When the skid control terminating condition is satisfied as checked at the step 1406, the RELEASE mode timer value L is cleared and a skid control state indicative period flag AS is reset at a step 1408. At a step 1410. Thereafter, process goes END.

If the skid control terminating condition as checked at the step 1406 is not satisfied, the RELEASE mode timer value L is again checked at a step 1412. When the RELEASE mode timer value L is smaller than or equal to zero as checked at the step 1412, the wheel acceleration α is compared with a predetermined acceleration threshold $+\alpha_1$ at a step 1414. If the acceleration as checked at the step 1414 is greater than or equal to the wheel acceleration threshold $+\alpha_1$, it means that the wheel is not yet decelerated after initiation of increasing of the braking pressure of wheel is acceleration during RELEASE mode cycle period. Therefore, in order to discriminate the instantaneous status of the braking condition, check is performed whether the skid control state indicative flag AS is set at a step 1416. When the skid control state indicative flag AS is not set as checked at a step 1416, then process goes to the process through the step 1410 for setting the operation mode to the NORMAL APPLICATION mode.

On the other hand, whenthe skid control state indicative flag AS is set as checked at the step 1416, then judgement is made that it is thetiming to switch the skid control cycle from the RELEASE mode cycle period to the HOLD mode cycle period because the wheel acceleration α is held greater than the wheel acceleration threshold $+\alpha_1$ and the operational mode is held in the RELEASE mode. Then, HOLD mode cycle period is commanded at a step 1418. After commanding the HOLD mode cycle period, the process goes END.

On the other hand, when the wheel acceleration α as compared with the wheel acceleration threshold $+\alpha_1$ at the step 1414, is smaller than the acceleration threshold $+\alpha_1$, then the wheel acceleration α is checked with a predetermined wheel deceleration threshold $-\alpha_2$ at a step 1420. When the wheel acceleration α as checked at the step 1420 is smaller than the wheel deceleration threshold $-\alpha_2$, it means that the braking condition requires anti-skid control. Then, at a step 1422, the HOLD mode cycle period is commanded for placing the pressure control valve 16 at the HOLD mode position, at a step 1424.

If the wheel aceleration α as compared with the wheel deceleration threshold $-\alpha_2$ at the step 1420 is greater than the wheel deceleration threshold, the skid control state indicative flag AS is checked at a step 1426. If the skid control mode indicative flag AS is not set as checked at the step 1426, process goes to the step 1408. On the other hand, when the skid control state indicative flag AS is not set as checked at the step 1426, the CONTROLLED APPLICATION mode cycle period is commanded at a step 1426.

On the other hand, when wheel slippage Si as checked at the step 1402 is greater than or equal to the wheel slippage threshold $S_O$, then the wheel acceleration α is compared with the wheel acceleration threshold $+\alpha_1$ at a step 1430. When the wheel acceleration α as checked at the step 1430 is greater than or equal to the wheel acceleration threshold $+\alpha_1$, judgement can be made that the condition does not satisfy to perform the RELEASE mode skid control cycle period operation. Therefore, the RELEASE mode timer value L is cleared at a step 1432. On the other hand, when the wheel acceleration α as checked at the step 1430 is smaller than the wheel acceleration threshold $+\alpha_1$, judgement can be made that a condition for performing the RELEASE mode skid control mode cycle period is satisfied. Therefore, at a step 1434, the RELEASE mode timer value L is set at a predetermined initial timer value $L_O$ which represents a period of maintain RELEASE mode skid control cycle period after the wheel slippage Si is decreased across the wheel slippage threshold $S_O$. At the same time, the skid control state indicative flag AS.

When the RELEASE mode timer value L as checked at the step 1404 is greater than zero (0), then, the RELEASE mode timer value L is decremented by one (1) at a step 1436 and thereafter process moves to the step 1406. When the RELEASE mode timer value L as decremented at the step 1436 is still held greater than zero (0), the answer at the step 1412 becomes positive since the RELEASE mode timer value is greater than zero. Then, process goes to a step 1438.

Figure 6:
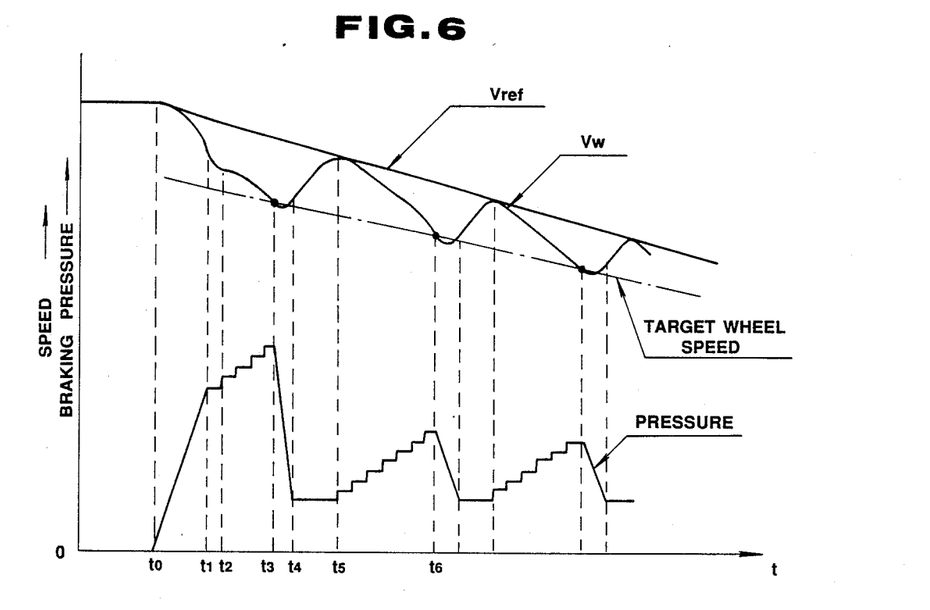
FIG. 6 is a timing chart showing operation of the preferred embodiment of the anti-skid brake control system according to the invention.

The example of practical operation of anti-skid control performed through the routine of FIG. 4 will be discussed herebelow with reference to FIGS. 5 and 6. It should be noted that, in FIG. 6, the solid line shows variation of wheel speed $V_w$ and the projected vehicle body speed $V_{ref}$ and the one-dotted line shows variation of a target wheel speed.

At the initial stage of braking operation starting at the time $t_0$, the wheel acceleration $\alpha$ is decreased across the wheel deceleration threshold $\alpha_{ref}$ to switch the reset signal level from HIGH level to LOW level. This results in introduction of he longitudinal acceleration data Gx for deriving the vehicle body speed representative data $V_{ref}$, through the step 1008. The wheel slippage Si is held smaller than the wheel slippage threshold $S_O$. Therefore, the answer in the step 1402 is held negative. The answer at the step 1404 also becomes negative. Since the brake is applied, the answer in the step 1406 is negative to indicate that the condition for satisfying termination of the anti-skid control is not established.

Example of the practical anti-skid brake control will be discussed herebelow with reference to FIG. 6. In the curves representative of respective speeds are shown in slightly offset form so as to avoid overlapping which makes it difficult to visually appreciate the variations. The vehicle is assumed to travel on a slippy, low friction road, such as icy road or snow road. At a time $t_O$, an operational force to an accelerator pedal is released. Then, the vehicle driving mode moves into engine braking mode for decelerating by negative driving torque of the engine. Since the negative driving torque is applied only to the rear wheels which are connected to the engine via the power train, therefore, the rear wheel subject decelerating force for deceleration. On the other hand, since the front wheels are free from the negative driving torque, they decelerate according to deceleration of the vehicle body. At a time $t_O$, the brake pedal 6 is depressed for braking operation. At the time $t_O$, the wheel slippage Si is maintained smaller than the wheel slippage threshold $S_O$ and the wheel deceleration (negative value of wheel acceleration) is maintained smaller than the wheel deceleration threshold $-\alpha_2$, the NORMAL APPLICATION mode is commanded at the step 1410 of the routine of FIG. 4. Accordingly, the braking pressure in respective wheel cylinder 9 increases according to building up of hydraulic pressure in the master cylinder 8. The wheel slippage Si is naturally held smaller than the wheel slippage criterion $S_1$, therefore, operation mode of the power train is maintained at the two-wheel drive mode.

Until the wheel aceleration $\alpha$ decreased to be smaller than the deceleration threshold $-\alpha_2$ is detected at the step 1410, the NORMAL APPLICATION mode is repeatedly commanded at the step 1410 for increasing the braking pressure in linear fashion as illustrated in the period $t_O$ to $t_1$. The wheel speed data Vw thus starts to decrease with a certain lag time. During the perod, in which NORMAL APPLICATION mode is maintained, deceleration rate at the rear wheels become greater than that of the front wheels because of negative driving torque active on the rear wheels. Therefore, at the initial stage of braking operation, the NORMAL APPLICATION mode skid cycle is performed for a period as indicated in FIG. 6. At a time $t_1$, the wheel acceleration $\alpha$ decreases across the deceleration threshold $-\alpha_{ref}$, this causes switching of operatiuon mode from NORMAL APPLICATION mode to HOLD mode. At a time $t_2$, the wheel acceleration $-\alpha$ is incresed to be greater than the deceleration threshold $-\alpha_2$. Then, NORMAL APPLICATION mode is again performed when the MODE indicative flag F is zero. On the other hand, when the MODE indicative flag F is one (1), then, the CONTROLLED APPLICATION mode is performed as illustrated in the period $t_2$ and $t_3$. By this the wheel speed is decreased across the wheel slippage criterion Sl to increased braking pressure at the time $t_3$, therefore, RELEASE mode is performed in the period $t_3$ to $t_4$. At the initial stage of the RELEASE mode skid control cycle period, the wheel acceleration $\alpha$ is maintained smaller than the wheel acceleration threshold $+\alpha_2$. Therefore, the answer in the step 1430 becomes negative. This causes setting of the RELEASE mode timer value L to the initial value $L_O$ and setting of the skid control state indicative flag AS, at the step 1434. By setting the RELEASE mode timer value L to $L_O$, the answer in the step 1412 becomes positive to command RELEASE mode skid control cycle period at the step 1438.

By decreasing the braking pressure in the RELEASE mode skid control cycle period, the wheel speed is resumed to decrease wheel slippage Si across the wheel slippage threshold $S_0$. This results in negative answer in the step 1402. As long as the RELEASE mode timer value L is held greater than zero (0), the answer in the step 1404 is held positive and is decreased by one (1) every occurrence of execution of the routine of FIG. 4. As long as the RELEASE mode timer value L is maintained greater than zero (0), the RELEASE mode skid control cycle period is repeatedly commanded fro maintaining the pressure control valve 16 at the RELEASE mode position, as illustrated in FIG. 4.

When the RELEASE mode timer value L is decreased to zero at the step 1436 or, in the alternative, when the wheel acceleration $\alpha$ becomes greater than or equal to the wheel acceleration threshold $+\alpha_1$ to turn the answer in the step 1430 into positive to cause clearing the RELEASE mode timer value L to zero at the step 1432, the answer in the step 1412 becomes negative. At this time, since the wheel acceleration $\alpha$ is greater than or equal to the wheel acceleration threshold $+\alpha_1$ and the skid control state indicative flag AS is set, the HOLD mode skid control cycle period is commanded at the step 1418 at a time $t_5$.

By maintaining the skid control cycle at the HOLD mode skid control cycle period as set forth, the wheel acceleration $\alpha$ is decreased across the wheel acceleration threshold $+\alpha_1$ at a time $t_5$. Then, the CONTROLLED APPLICATION mode skid control cycle period is commanded at the step 1428 since the skid control state indicative flag AS is held in set position until the time $t_6$.

Through the process at set forth above, precise brake control becomes possible. Furthermore, according to the present invention, since the longitudinal acceleration indicative data is provided the predetermined offset value for increasing the deceleration at given level, avoidance of no braking state can be assured.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the specific technologies have been disclosed hereinbefore in terms of the preferred embodiment of the present invention, the technologies disclosed in the following United States Patents, all owned by the common assignee to the present invention.

U.S. Pat. No. 4,408,290, issued on Oct. 4, 1983
U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on June 16, 1987
U.S. Pat. No. 4,680,714, issued on July 14, 1987
U.S. Pat. No. 4,682,295, issued on July 21, 1987
U.S. Pat. No. 4,680,713, issued on July 145, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986
U.S. Pat. No. 4,662,686, issued on May 5, 1987
U.S. Pat. No. 4,667,176, issued on May 19, 1987
U.S. Pat. No. 4,597,052, issued on June 24, 1986
U.S. Pat. No. 4,637,663, issued on Jan. 20, 1987
U.S. Pat. No. 4,683,537, issued on July 28, 1987
U.S. Pat. No. 4,809,182, issued on Feb. 28, 1989
U.S. Pat. No. 4,805,103, issued on Feb. 14, 1989
will be applicable for implementing the present invention. Furthermore, the technology for cooperating with the power train control for switching operation of power train between four-wheel drive mode and two wheel drive modes may be applicable not only for anti-skid brake control system but also for traction control technologies utilizing technologies close to the anti-skid brake control. For example, the traction control technologies have been disclosed in the following United States Patents which are also owned by the common owner of the present invention:

U.S. Pat. No. 4,763,912, issued on Aug. 16, 1988
U.S. Pat. No. 4,771,850, issued on Sept. 20, 1988

The disclosure of the above-identified United States Patents will be herein incorporated by reference for the sake of disclosure.

What is claimed is:

1. An anti-skid brake control system for controlling a braking pressure for maintaining a wheel slippage in the vicinity of a predetermined optimum level said anti-skid control system comprising:
   a braking circuit connecting a pressurized fluid source to a wheel cylinder for each of said front and rear wheels for building up braking pressure in the latter;
   a pressure control valve means, disposed in said braking circuit, for controlling braking pressure in said wheel cylinder, said pressure control valve means operable for increasing braking pressure in said wheel cylinder in a first mode, decreasing braking pressure in said wheel cylinder in a second mode, and to hold the braking pressure in said wheel cylinder constant in a third mode;
   first sensor for monitoring rotation speed of associated one of the front and rear wheels for producing a wheel speed indicative signal;
   second means for deriving a wheel slippage on the basis of said wheel speed indicative signal and producing a wheel slippage data;
   control means for producing a first control signal for controlling operation mode of said pressure control valve means for switching operation mode between said first, second mode and third mode in order to maintain wheel slippage in the vicinity of said predetermined optimum value, said control means measuring a period in which said pressure control valve means is maintained at said third mode subsequently of said first mode operation so that increasing rate of braking pressure is varied according to said period.

2. An anti-skid brake control system as set forth in claim 1, wherein said control means select one of said first and third mode for controlling said pressure control valve operational mode while said wheel slippage is maintained smaller than a predetermined wheel slippage criterion.

3. An anti-skid brake control system as set forth in claim 2, wherein said control means selects said first mode when a wheel acceleration derived on the basis of said wheel speed indicative signal is maintained greater than a predetermined wheel slippage threshold and otherwise selects said third mode.

4. An anti-skid brake control system as set forth in claim 3, wherein said control means selects said second mode when said wheel slippage is maintained greater than or equal to said predetermined wheel slippage criterion.

5. An anti-skid brake control system as set forth in claim 1, wherein said control means compares said measured period with a predetermined time threshold so that a first greater increasing rate of the braking pressure in said wheel cylinder in said first mode is selected when said measured period is shorter than said time threshold and otherwise select a second smaller increasing rate.

6. An anti-skid brake control system as set forth in claim 5, wherein said pressure control valve is maintained in said first mode for linearly increasing braking pressure when said first greater increasing rate is selected, and is periodically alternated between said first and third mode with short intervals for increasing braking pressure in stepwise fashion when said second smaller increasing rate is selected.

7. An anti-skid brake control system for controlling a braking pressure for maintaining a wheel slippage in the vicinity of a predetermined optimum level said anti-skid control system comprising:
   a braking circuit connecting a pressurized fluid source to a wheel cylinder for each of said front and rear wheels for building up braking pressure in the latter;
   a pressure control valve means, disposed in said braking circuit, for controlling braking pressure in said wheel cylinder, said pressure control valve means operable for increasing braking pressure in said wheel cylinder in a first mode, decreasing braking prssure in said wheel cylinder in a second mode, and to hold the braking pressure in said wheel cylinder constant in a third mode;
   first sensor for monitoring rotation speed of associated one of the front and rear wheels for producing a wheel speed indicative signal;
   second means for deriving a wheel slippage on the basis of said wheel speed indicative signal and producing a wheel slippage data;
   control means for producing a first control signal for controlling operation mode of said pressure control valve means for switching operation mode between said first, second mode and third mode in order to maintain wheel slippage in the vicinity of said predetermined optimum value, said control means measuring a period in which said pressure control valve means is maintained at said third mode subsequently of said first mode operation, said control means comparing said measured period with a predetermine time threshold so that a first greater increasing rate of the braking pressure in said wheel cylinder in said first mode is selected when said measured period is shorter than said time threshold and otherwise select a second smaller increasing rate.

8. An anti-skid brake control system as set forth in claim 7, wherein said pressure control valve is maintained in said first mode for linearly increasing braking pressure when said first greater increasing rate is selected, and is periodically alternated between said first and third mode with short intervals for increasing braking pressure in stepwise fashion when said second smaller increasing rate is selected.

9. An anti-skid brake control system as set forth in claim 8, wherein said control means select one of said first and third mode for controlling said pressure control valve operational mode while said wheel slippage is maintained smaller than a predetermined wheel slippage criterion.

10. An anti-skid brake control system as set forth in claim 9, wherein said control means selects said first mode when a wheel acceleration derived on the basis of said wheel speed indicative signal is maintained greater than a predetermined wheel slippage threshold and otherwise selects said third mode.

11. An anti-skid brake control system as set forth in claim 10, wherein said control means selects said second mode when said wheel slippage is maintained greater than or equal to said predetermined wheel slippage criterion.

* * * * *